Dec. 29, 1931.  W. J. SCHIRMANN  1,838,575
DIRECTIONAL SIGNAL FOR AUTOMOBILES
Filed June 20, 1928

Inventor
William J. Schirmann
By Popp & Powers
Attorneys

Patented Dec. 29, 1931

1,838,575

UNITED STATES PATENT OFFICE

WILLIAM J. SCHIRMANN, OF BUFFALO, NEW YORK

DIRECTIONAL SIGNAL FOR AUTOMOBILES

Application filed June 20, 1928. Serial No. 286,722.

This invention relates to a directional signal for use on automobiles and more particularly to a "left turn" signal which is adapted to be mounted in a position in which it projects laterally outward from the side of the automobile and when illuminated gives a signalling indication that the driver is about to make a left turn and thereby apprise other drivers of his intention and avoiding a possible accident.

One of the objects of this invention is to provide such a signal which gives an indication both to the traffic in rear of the car and in front of the same and also to pedestrians and traffic officers, thereby informing all who might be liable to get in the way that a left turn is about to be made.

A further object of this invention is to provide means whereby the beams of light from the headlights of cars approaching from either the front or the rear are prevented from passing through the translucent portions of the signal in an amount sufficient to effectively illuminate the same. Without the provision of means to prevent it such accidental illumination of the signal from light originating in the headlights of cars approaching from the front or from the rear might illuminate the signal sufficiently to give an erroneous signalling indication to the drivers in rear or front of the automobile carrying the signal, and such driver in following the accidental and erroneus signalling indication might so maneuver as to cause an accident.

A further object is to provide a clearly visible signal which is simple, reliable and inexpensive and in which parts which normally would become waste or scrap are employed in other parts of the signal and in which the lights or translucent parts are made of a light, thin, flexible and practically unbreakable material such as celluloid or the like.

Other objects are to provide a signal which can be readily operated without opening the car door window, which is attractive and ornamental, and in which there is practically no cost or upkeep in its operation.

In the accompanying drawings.

Similar reference numerals indicate similar parts in each of the figures.

Figures 1, 2, 3:
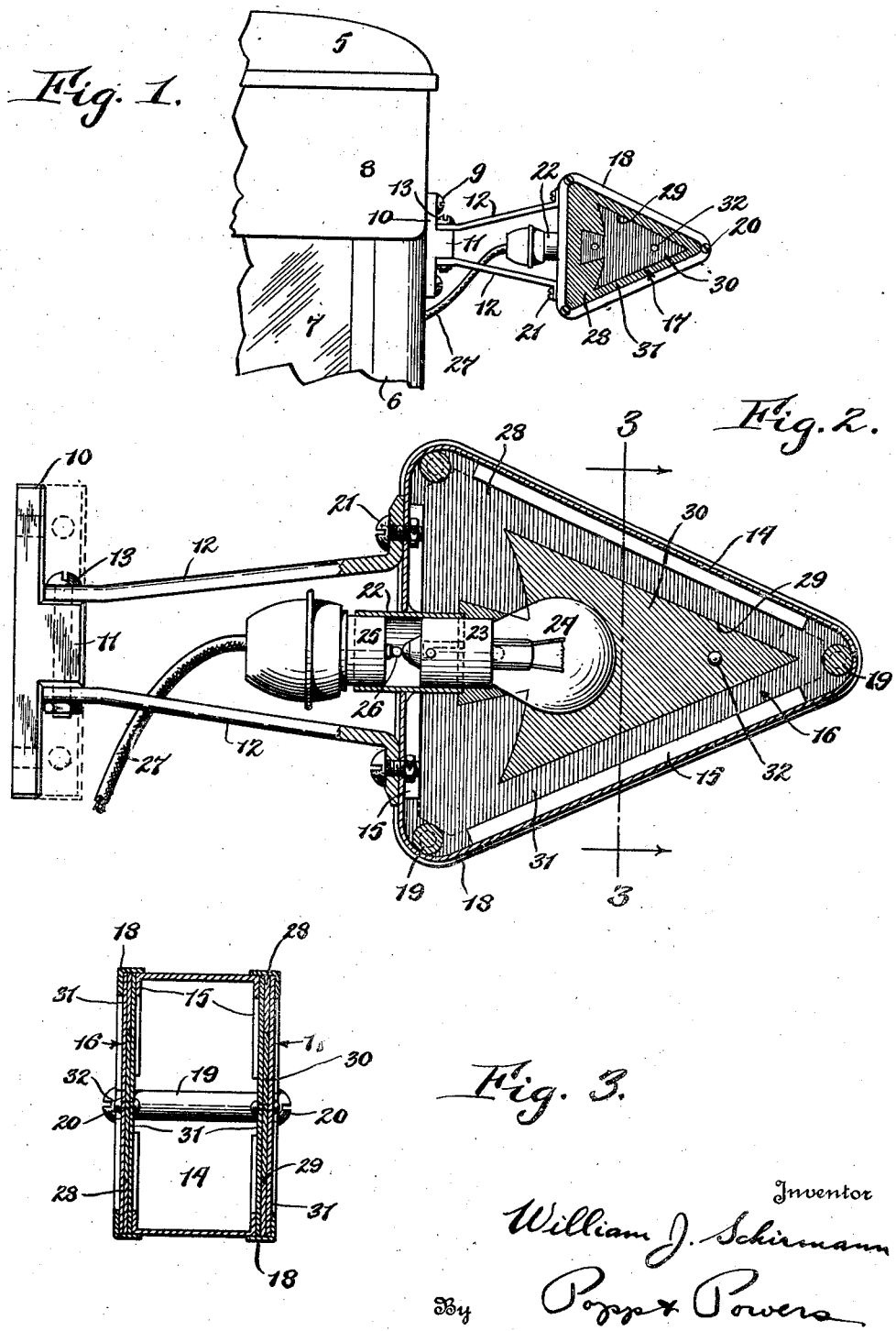
Figure 1 is a fragmentary view of the front upper corner of the body of an automobile showing my improved signal mounted on one of the posts thereof and projecting laterally outward from the side of the car.
Figure 2 is a vertical longitudinal section.
Figure 3 is a vertical transverse section taken on line 3—3, Fig. 2.

In its general organization this invention comprises an open sided rim which is adapted to be mounted adjacent the side of the car in a position in which it projects laterally outward therefrom and has its open sides facing forwardly and rearwardly, translucent panes mounted in the opposite open sides of the rim, and an electric light bulb mounted in the rim and it being adapted to illuminate both of said panes, the opposing portions of the translucent panes being of complementary colors whereby the greater part of the beams of light from an approaching car are absorbed by the panes, in combination, and prevented from giving an accidental, and unintentional signalling indication. The panes are also so constructed that normally scrap or waste parts from one pane are used in the other pane and vice versa.

The signal is shown as mounted on an automobile of the sedan type which has a top 5, corner posts 6, a wind shield 7, and a sun visor 8 which extends across and shades the upper part of the wind shield against the direct rays of the sun.

Suitably secured to the side or front of the post 6 as by means of screws 9 is a bracket 10 having a lug 11 to the upper and lower sides of which supporting arms 12, 12 are secured. The inner ends of the supporting arms 12, 12 are preferably squared and are secured to the lug 11 by means of a bolt 13 which extends vertically through these members. By this means it will be apparent that the bracket 10 can be arranged in any of three positions relative to the arms 12, i. e. the bracket 10 can be arranged in line with the arms 12, or it can be arranged at right angles thereto. By this arrangement the bracket 10 can be mounted either on the side of the post 6, as shown in Fig. 1 or it can be mounted on the front of the same and in either position the signal arms 12, 12 can be arranged so that the signal casing 14 is arranged to project laterally outward from the side of the car.

The signal casing 14 is in the form of a continuous rim which is open at its front and rear sides and is preferably triangular in outline so that the signal as a whole has the general shape of an arrowhead which is a common directional form. Flanges 15 extend inwardly from the front and rear sides of the rim 14, preferably three of such flanges being provided on each side of the rim. These flanges form the abutment for the translucent panes 16 and 17 which are adapted to be illuminated to give the signalling indication. Each of these panes is made of a translucent flexible sheet material such as celluloid or the like, as hereinafter described and are held in place by triangular retaining rims 18, 18 which are L-shaped in cross section and engage the margin of each of the panes and the outer side of the rim 14 and securely hold the panes in place. For this purpose fiber spacers 19 are arranged in each corner of the signal casing and engage the inner sides of each of the panes 16 and 17. Each of these fiber spacers 19 is provided with threaded openings in its opposite ends which receive screws 20.

These screws extend through the corresponding retaining rim 18 and the translucent pane and firmly hold the retaining rim and pane against the side flanges 15 of the casing 14. By the provision of the fiber spacers 19, the parts are in a certain measure yieldingly held together, and the danger of the parts becoming loose and rattling under the vibration of the automobile is thereby reduced. The casing is secured to the outer ends of the supporting arms 12, 12 by means of bolts 21, or in any other suitable manner.

Any suitable means may be employed for illuminating the signal when the driver intends to make a left turn. The means shown in the drawings comprises a sleeve 22 which extends through the inner side of the rim 14 and removably supports the base 23 of an electric light bulb 24. Preferably the base 23 of the electric light bulb is secured to the sleeve 22 by means of a bayonet connection of the usual form. In the inside of the outer end of the sleeve 22 a plug 25 is supported which plug carries the usual spring loaded contact pin 26 which is adapted to engage the contact at the inner end of the base 23 of the electric light bulb. The base 23 of the electric light is preferably grounded and the spring loaded contact 26 is connected by means of a wire 27 with a switch (not shown) by means of which the electric light is illuminated. This switch is mounted within convenient reach of the driver of the automobile so that when he desires to make a left turn he closes the switch, thereby illuminating the signal.

Each of the panes 16 and 17 is made of several layers of a colored flexible sheet material, such as celluloid or the like and is constructed as follows:

The numeral 28 represents a sheet of celluloid of one color which is of triangular outline and is provided at its center with an arrow-head shaped opening 29. Within this opening 29 is arranged a celluloid arrow-head 30 of another color which arrow-head conforms to the shape of the opening. The arrow-head 30 thereby forms a direction indicating character which is surrounded by the marginal portion 28. In order to give the greatest contrast to the arrow-head, and also to diminish the passage of headlight beams from other cars, the arrow-head and its supporting marginal portion are of complementary colors, one of these colors, as shown in the drawings, being preferably red and the other green. To support the character portion 30 within the opening 29 transparent celluloid sheets 31 are arranged on opposite sides thereof between which are arranged each of the marginal portions 28 and its character 30. These supporting sheets conform in outline to the respective marginal portion 28 and to the casing and the character or arrow-head 30 is secured to these supporting sheets by means of a pair of rivets 32 which extend through the character and each of the supporting sheets 31 arranged on opposite sides thereof. A transparent cement or the like can also obviously be used in place of the rivets 32. By this means the panes are made and assembled in the signal casing as a complete unit.

In order to prevent the beams of light from the headlights of approaching cars from shining through the panes 17 and 16 and illuminating the rear pane 16 sufficiently to give an erroneous signalling indication, the respective marginal portions and the characters of each pane are of complementary color. That is, the marginal portion 28 of the rear pane is of a red color while the marginal portion 28 of the front pane is of a green color, and the character 30 of the rear pane is of a green color, while the character 30 of the front pane 17 is of a red color.

The greater part of the light from the head lights of the car approaching the automobile on which the signal is mounted strikes the signal substantially squarely. By this means when such head light beam strikes the front pane 17, the only color which can pass the red arrow head is a red color and the only color which can pass the marginal portion 28 is a green color. When these green and red beams strike the rear pane 16, the green beam from the front marginal portion will be absorbed by the red marginal portion of the rear pane, and the red beam from the front arrow-head will be absorbed by the green arrow-head of the rear pane. By this means the beam from the head lights of the approaching car is substantially completely absorbed by the two panes, and consequently in combination they are substantially opaque to exterior beams of light, thereby eliminating the danger of being illuminated by such beams and giving an erroneous signalling indication. There is, of course, a certain amount of light which strikes the signal obliquely to the signal face and some of such rays will pass through parts having the same color on both sides of the signal and effect a partial illumination of the signal, but as such light is not of sufficient intensity to provide an effective illumination of the signal, the signal is, for practical purposes, opaque to exterior beams of light.

By so constructing the panes 16 and 17, the red arrow-head which was stamped out of the blank in forming the rear marginal portion 28 can be utilized as the arrow-head 30 for the front pane, and the green arrow-head stamped out of the blank for forming the front marginal portion 28 can be used as the arrow-head 30 in the rear pane. By this means not only is there a substantial saving in material and a utilization of portions which would otherwise become scrap or waste, but also one die can be used in forming the parts 28 and 30 of both the front and rear pane, this die cutting both the marginal portions 28 and the arrow-heads 30 for each pane.

As a whole this invention is extremely simple and inexpensive in construction, it can be readily mounted on cars of standard design, it contains few parts and is not likely to get out of order, also by the arrangement of colored parts in the panes as described accidental illumination of the signal to an effective extent from exterior beams of light is prevented, thereby eliminating the danger of accidents from this cause. The signal can also be made with a minimum amount of waste or scrap.

I claim as my invention:

1. A directional signal for automobiles, comprising an open sided rim, means for mounting said rim in a position in which it projects laterally outward from the side of the automobile with its open sides projecting forwardly and rearwardly, respectively, vertical translucent panes arranged across the open sides of said rim and an electric light bulb arranged in said casing and simultaneously illuminating said panes, each of said panes being formed to provide a central direction indicating character and a surrounding marginal portion, said character and margin of each pane being of substantially complementary colors and the characters of both of said panes being of substantially complementary colors and the margins of both of said panes being of substantially complementary colors; and said margins and indicating characters of each pane being of substantially the same form and size and registering with one another whereby said panes, in combination, substantially absorb the exterior beams of light from the front and the rear of the automobile and prevent an accidental effective signalling indication thereof.

2. A directional signal for automobiles, comprising a casing having openings on its opposite sides, a translucent pane arranged across each of said open sides, and an electric light bulb arranged in said casing and being adapted to illuminate said panes, each of said panes comprising a colored margin portion of translucent flexible sheet material and having a direction indicating opening provided centrally therein, a direction indicating character conforming to said opening and fitted therein, said character contrasting in color with said marginal portion, and a pair of translucent sheets of flexible material arranged along opposite sides of said marginal portion and supporting said character in said opening.

3. A directional signal for automobiles, comprising a casing having openings on its opposite sides, a translucent pane arranged across each of said open sides, an electric light bulb arranged in said casing and being adapted to illuminate said panes, each of said panes comprising a colored margin portion of translucent flexible sheet material and having a direction indicating opening provided centrally therein, a direction indicating character conforming to said opening and fitted therein, said character contrasting in color with said marginal portion, and a pair of translucent sheets of flexible material arranged along opposite sides of said marginal portion and held in fixed relation thereto and fastenings extending through said last named translucent sheets and said character whereby said character is supported in said opening.

In testimony whereof I hereby affix my signature.

WILLIAM J. SCHIRMANN.